(12) United States Patent
Wang et al.

(10) Patent No.: US 11,255,292 B2
(45) Date of Patent: Feb. 22, 2022

(54) INTAKE SWIRL GASKET

(71) Applicant: PANG CHIH INDUSTRIAL CO., LTD., Tainan (TW)

(72) Inventors: Yu-Jen Wang, Tainan (TW); Yu-Feng Wang, Tainan (TW); Hao-Yu Shih, Tainan (TW)

(73) Assignee: Pang Chih Industrial Co., Ltd., Tainan (TW)

( * ) Notice: Subject to any disclaimer, the term of this patent is extended or adjusted under 35 U.S.C. 154(b) by 0 days.

(21) Appl. No.: 16/993,567

(22) Filed: Aug. 14, 2020

(65) Prior Publication Data

US 2021/0102512 A1   Apr. 8, 2021

(30) Foreign Application Priority Data

Oct. 4, 2019   (TW) ................................ 108136076

(51) Int. Cl.
| | |
|---|---|
| *F02F 11/00* | (2006.01) |
| *F02M 35/10* | (2006.01) |
| *F02M 21/04* | (2006.01) |
| *F02M 35/112* | (2006.01) |

(52) U.S. Cl.
CPC ......... *F02F 11/002* (2013.01); *F02M 21/045* (2013.01); *F02M 35/10059* (2013.01); *F02M 35/10078* (2013.01); *F02M 35/10262* (2013.01); *F02M 35/112* (2013.01)

(58) Field of Classification Search
CPC ............. F02F 11/002; F02M 35/10078; F02M 35/10262; F02M 35/12; F02M 35/10059; F02M 21/045
See application file for complete search history.

(56) References Cited

U.S. PATENT DOCUMENTS

| | | | | |
|---|---|---|---|---|
| 3,965,873 A * | 6/1976 | Konomi | ........... | F02M 35/10078 123/184.53 |
| 4,020,805 A * | 5/1977 | Konomi | ........... | F02M 35/10078 123/184.53 |
| 6,752,124 B1 * | 6/2004 | Chang | .................. | F02M 19/088 123/306 |

* cited by examiner

*Primary Examiner* — Jacob M Amick
(74) *Attorney, Agent, or Firm* — Rosenberg, Klein & Lee (57) ABSTRACT

An intake swirl gasket is disclosed herein. It is installed between a cylinder head and an intake manifold and comprises plural airflow holes for respectively communicating with plural intake passages of the cylinder head; and plural diversion devices respectively disposed in the plural airflow holes and each having an axis and plural splitter blades extended from the axis for connecting to an inner wall of each of the plural airflow holes, wherein each of the plural splitter blades is shaped as an arc to form a recessed surface towards the intake manifold at one side thereof and a convex surface towards the cylinder head at the other side thereof, and wherein an included angle between each of the plural splitter blades and an end face of the intake swirl gasket oriented towards the cylinder head ranges from 50 to 80 degrees.

4 Claims, 8 Drawing Sheets

INTAKE SWIRL GASKET

BACKGROUND OF THE INVENTION

1. Field of the Invention

The present invention relates to an intake swirl gasket which effectively mixes airflow with atomized oil to fill in a cylinder of an engine rapidly so as to achieve better efficiencies of oil gas filling and mixing, which not only improves engine combustion efficiency and enhances horsepower, but also reduces engine knock, exhaust emissions, and fuel consumption.

2. Description of Related Art

With the advancement of technology, the invention of motor vehicles made people's lives far more convenient. Various types of motor vehicles that provide comforts for people to use to reach their destination quickly and conveniently. Since the use of various motor vehicles as a means of transportation for people can greatly shorten the time it takes to travel around and improve the convenience of people's daily life, more types of motor vehicles have been developed and the popularity of using motor vehicles has increased. Nowadays, motor vehicles have been regarded as one of the necessities of people, so all kinds of motor vehicles can be seen everywhere.

Figure 8:
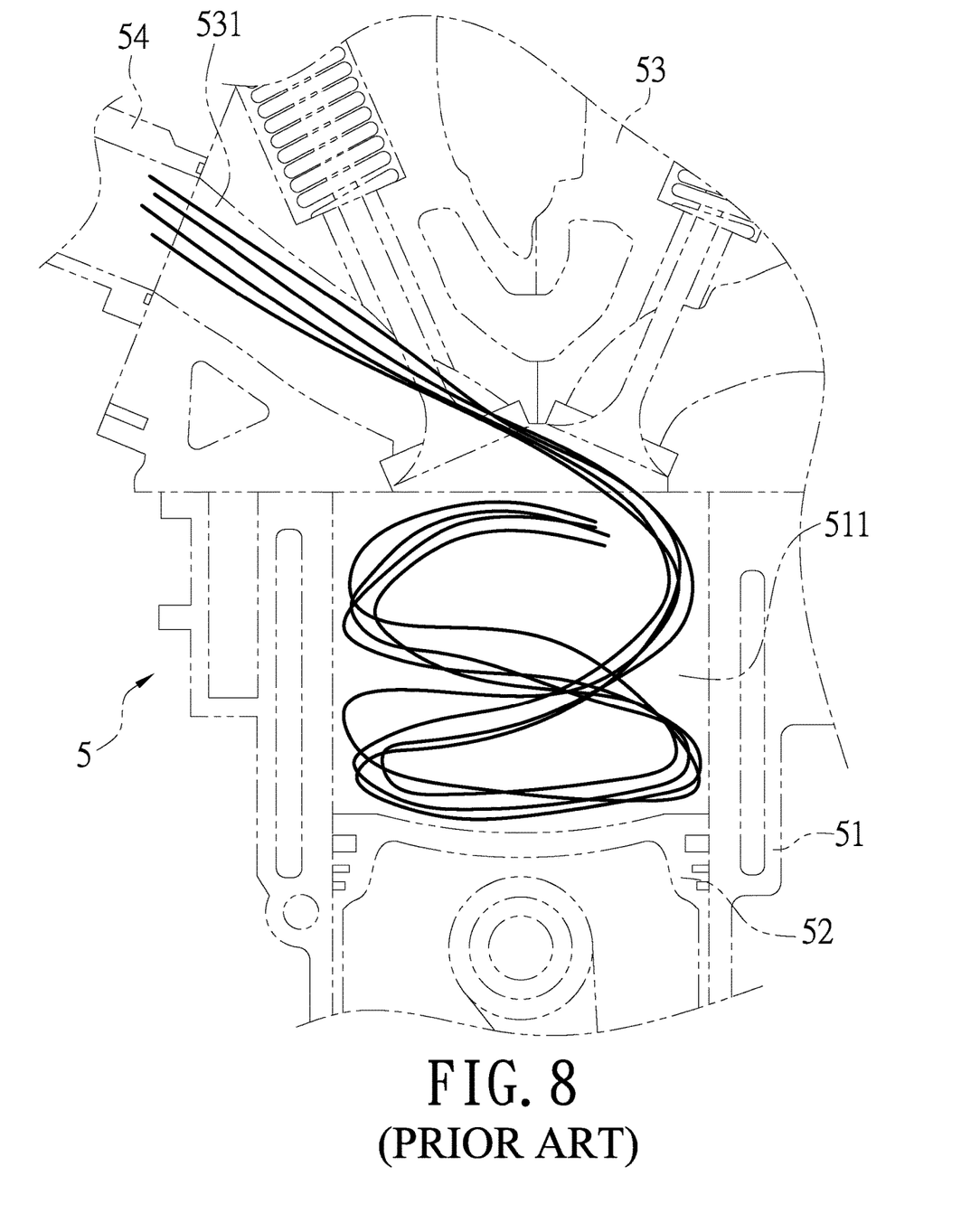
FIG. 8 is a sectional view showing an engine in an intake state of a conventional vehicle.

Referring to FIG. 8, an engine (5) in an intake state of a conventional vehicle comprises a main body (51) having plural cylinders (511), plural pistons (52) respectively disposed in the plural cylinders (511), a cylinder head (53) covered at a top of the main body (51) and having plural intake passages (531) communicated with the plural cylinders (511), and an intake manifold (54) connected to the cylinder head (53). Therefore, an external airflow can enter into the plural cylinders (511) of the main body (51) through the intake manifold (54) and the plural intake passages (531) of the cylinder head (53) and mix with the atomized oil in the plural cylinders (511) to form oil gas, and then the plural pistons (52) compress the oil gas, so that the spark plug ignites the oil gas to generate power.

Although the conventional engine can achieve the expected effect of generating power by igniting the oil gas, the airflow cannot be evenly distributed and guided into the plural intake passages when the external airflow enters from the intake manifold into the plural intake passages of the cylinder head. After the airflow enters the cylinder, it moves along an inner wall of one side of the cylinder towards a top of the piston. The airflow does not mix with atomized oil in the plural cylinders (511) to form oil gas until it contacts the diversion design on the top of the piston. Therefore, the conventional engine still has disadvantages of low combustion efficiency, high fuel consumption, high knock, large amount of exhaust gas and the like in its actual operation and use.

SUMMARY OF THE INVENTION

In view of the above-mentioned problems, the object of the present invention is to provide an intake swirl gasket which is installed between a cylinder head and an intake manifold and comprises plural airflow holes and plural diversion devices so that the airflow can be evenly distributed and guided into plural intake passages of the cylinder head and effectively mixed with atomized oil to be rapidly filled in a cylinder of an engine so as to achieve better efficiencies of oil gas filling and mixing. Accordingly, the present invention achieves effects of improving engine combustion efficiency, enhancing horsepower, and reducing engine knock, exhaust emissions, and fuel consumption.

The intake swirl gasket is installed between a cylinder head and an intake manifold. The intake swirl gasket comprises plural airflow holes for respectively communicating with plural intake passages of the cylinder head; and plural diversion devices respectively disposed in the plural airflow holes. Each of the diversion devices has an axis and plural splitter blades extended from the axis for connecting to an inner wall of each of the plural airflow holes. Furthermore, each of the plural splitter blades is shaped as an arc to form a recessed surface towards the intake manifold at one side thereof and a convex surface towards the cylinder head at the other side thereof. An included angle between each of the plural splitter blades and an end face of the intake swirl gasket oriented towards the cylinder head ranges from 50 to 80 degrees.

According to an embodiment of the present invention, the inner wall of each of the plural airflow holes defines a tapered opening to increase flow velocity of airflows through the plural splitter blades.

According to an embodiment of the present invention, further being formed integrally with the intake manifold.

According to an embodiment of the present invention, the axis of each of the diversion devices is shaped as a cone.

DETAILED DESCRIPTION OF THE PREFERRED EMBODIMENT

Hereinafter, an exemplary embodiment of the present invention will be described in detail with reference to the accompanying drawings.

Figure 1:
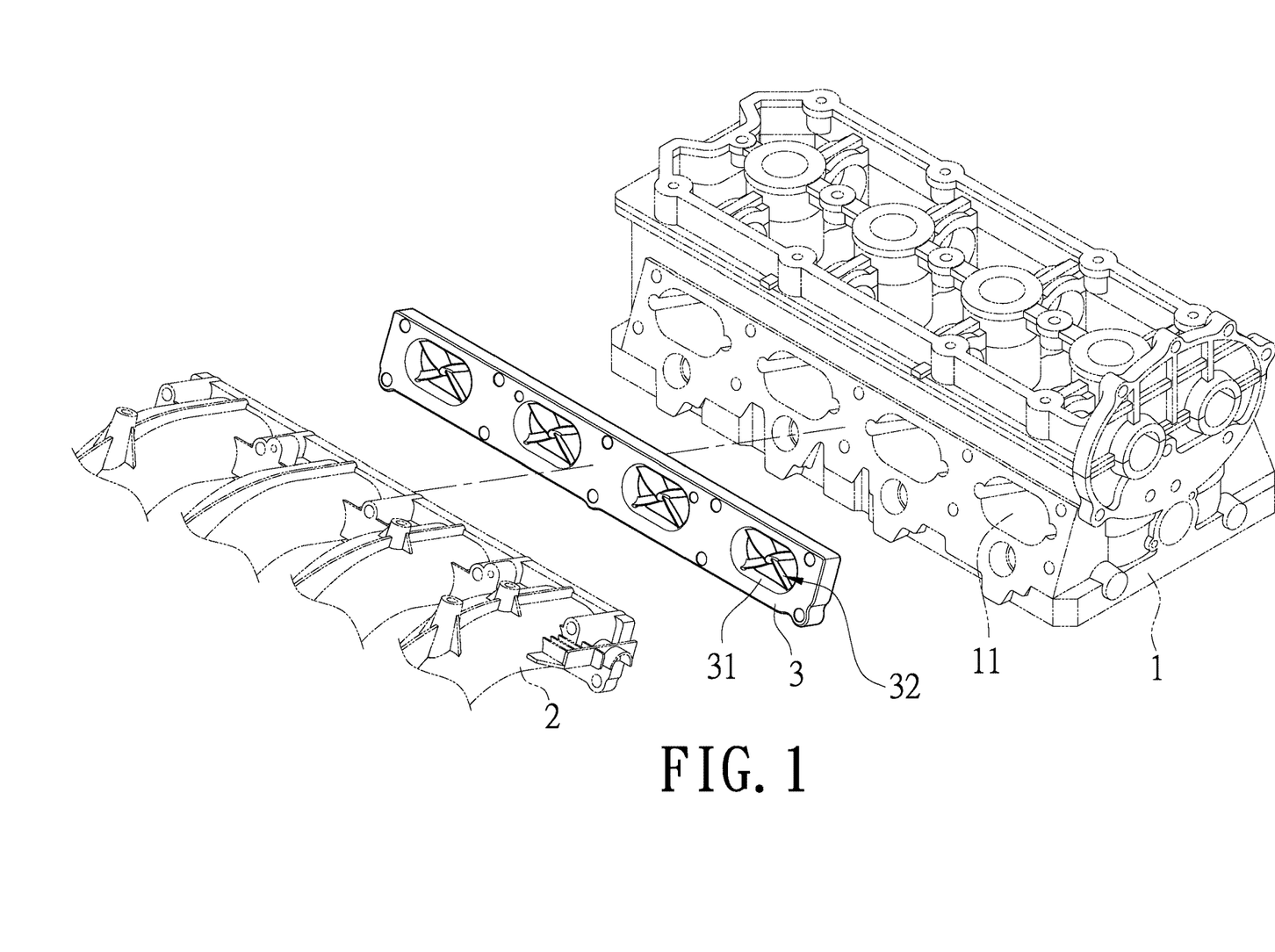
FIG. 1 is a stereogram showing an intake swirl gasket in use according to the present invention.
Figure 2:
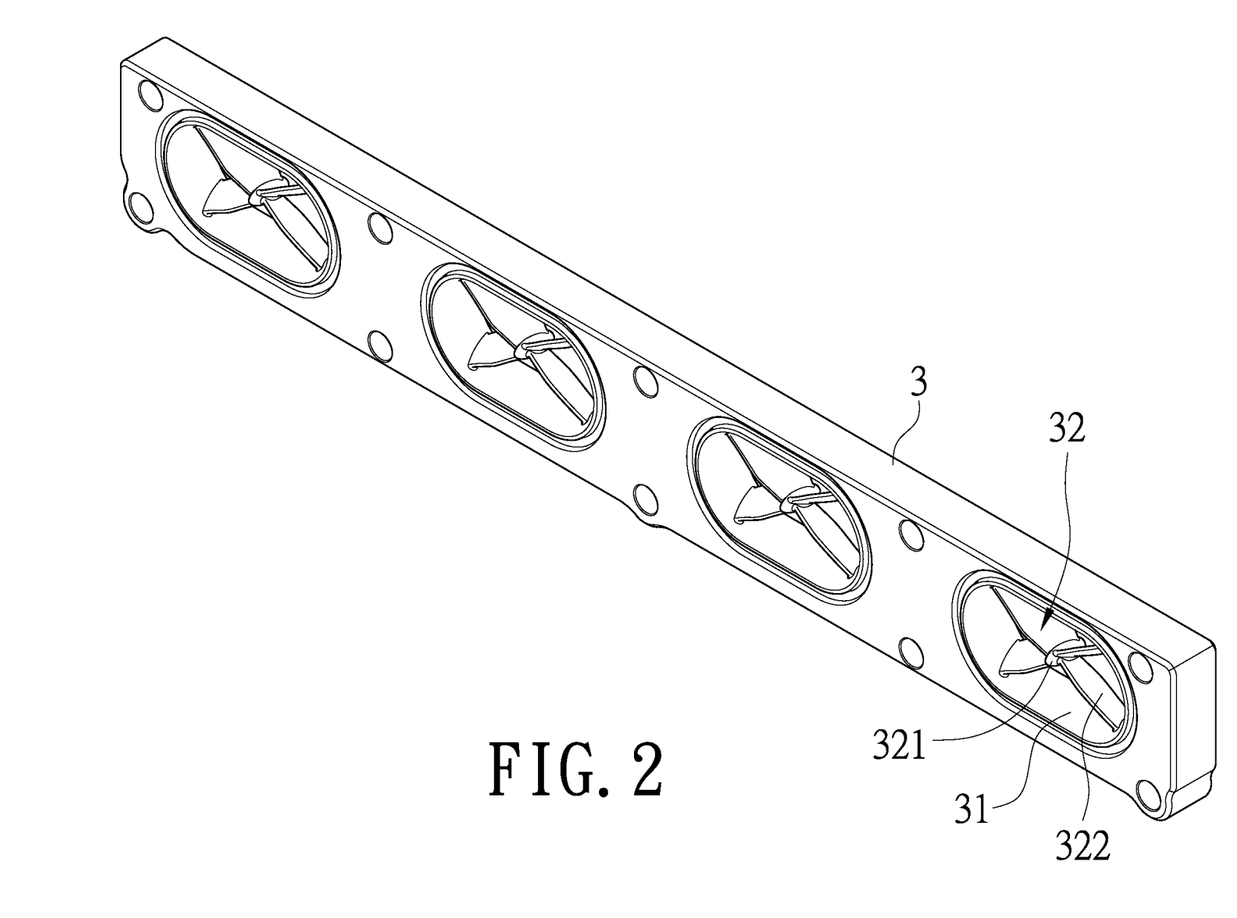
FIG. 2 is a stereogram showing a first embodiment for an intake swirl gasket according to the present invention.
Figure 3:
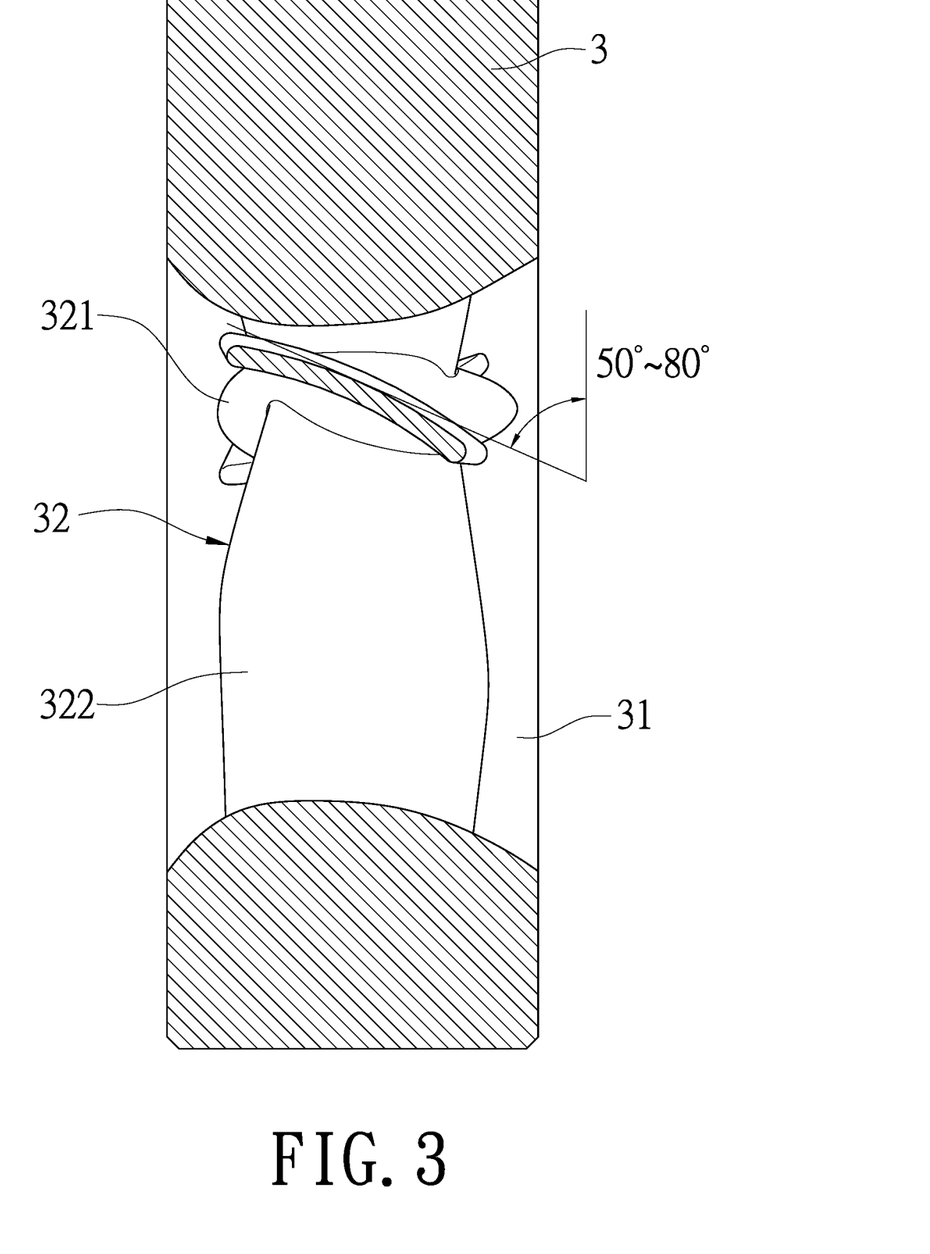
FIG. 3 is a sectional view showing the first embodiment for the intake swirl gasket according to the present invention.

Referring to FIG. 1 to FIG. 3, a first embodiment for an intake swirl gasket according to the present invention is disclosed herein. An intake swirl gasket (3) is installed between a cylinder head (1) and an intake manifold (2). The cylinder head (1) has plural intake passages (11). After the cylinder head (1) is assembled to the intake manifold (2), the external airflow can enter the plural intake passages (11) of the cylinder head (1) through the intake manifold (2).

The intake swirl gasket (3) comprises plural airflow holes (31) for respectively communicating with the plural intake passages (11) of the cylinder head (1); and plural diversion devices (32) respectively disposed in the plural airflow holes (31). Each of the plural diversion devices (32) has an axis (321) and plural splitter blades (322) extended from the axis (321) for connecting to an inner wall of each of the plural airflow holes (31). Each of the plural splitter blades (322) is shaped as an arc to form a recessed surface towards the intake manifold (2) at one side thereof and a convex surface towards the cylinder head (1) at the other side thereof. Furthermore, an included angle between each of the plural splitter blades (322) and an end face of the intake swirl gasket (3) oriented towards the cylinder head (1) ranges from 50 to 80 degrees. The inner wall of each of the plural airflow holes (31) defines a tapered opening to increase flow velocity of airflows through the plural splitter blades (322).

Figure 4:
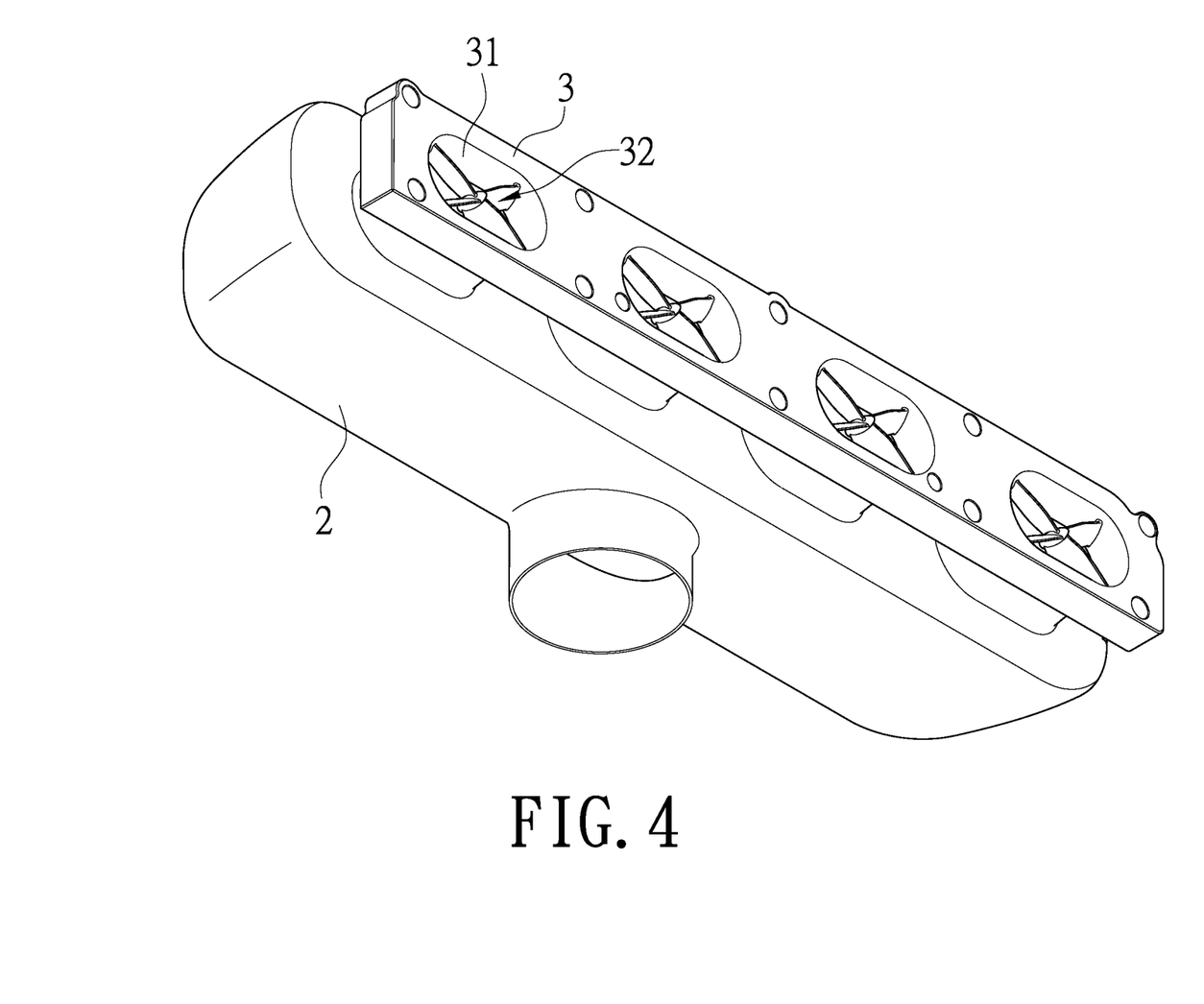
FIG. 4 is a stereogram showing a second embodiment for an intake swirl gasket according to the present invention.

Referring to FIG. 4, second embodiment for an intake swirl gasket according to the present invention is also disclosed herein. The intake swirl gasket (3) is formed integrally with the intake manifold (2), and then the intake manifold (2) is further assembled to the cylinder head (1) together with the intake swirl gasket (3).

Figure 5:
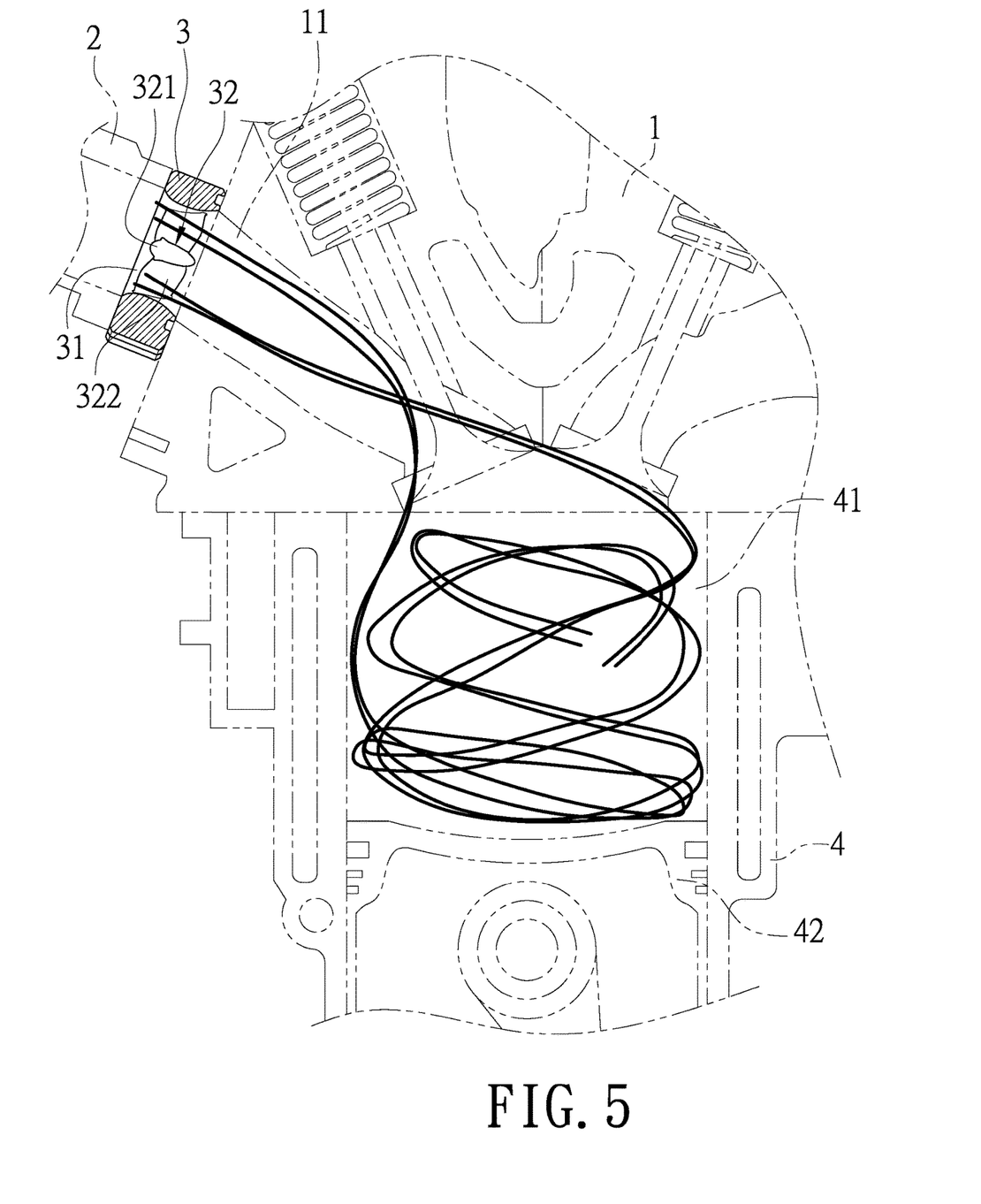
FIG. 5 is a sectional view showing an engine in an intake state and airflows passing through an intake swirl gasket according to the present invention.

In use of the present invention as shown in FIG. 5, the intake swirl gasket (3) is installed between the cylinder head (1) and the intake manifold (2), and then the cylinder head (1) is assembled to an engine (4). The engine (4) has plural cylinders (41) respectively communicating with the plural intake passages (11) of the cylinder head (1), and plural pistons (42) respectively corresponding to the plural cylinders (41). After the external airflow passes through the intake manifold (2) to the plural airflow holes (31) of the intake swirl gasket (3), the airflow in the plural airflow holes (31) is affected by the plural diversion devices (32). The airflow passing through the axis (321) and the plural splitter blades (322) of the plural diversion devices (32) is evenly distributed and guided into the plural intake passages (11) of the cylinder head (1), and further guided into the plural cylinders (41) of the engine (4). Therefore, the airflow is mixed with atomized oil in the plural cylinders (41) to form oil gas. Then, the plural pistons (42) compress the oil gas, so that the spark plug ignites the oil gas to generate power.

Figure 6:
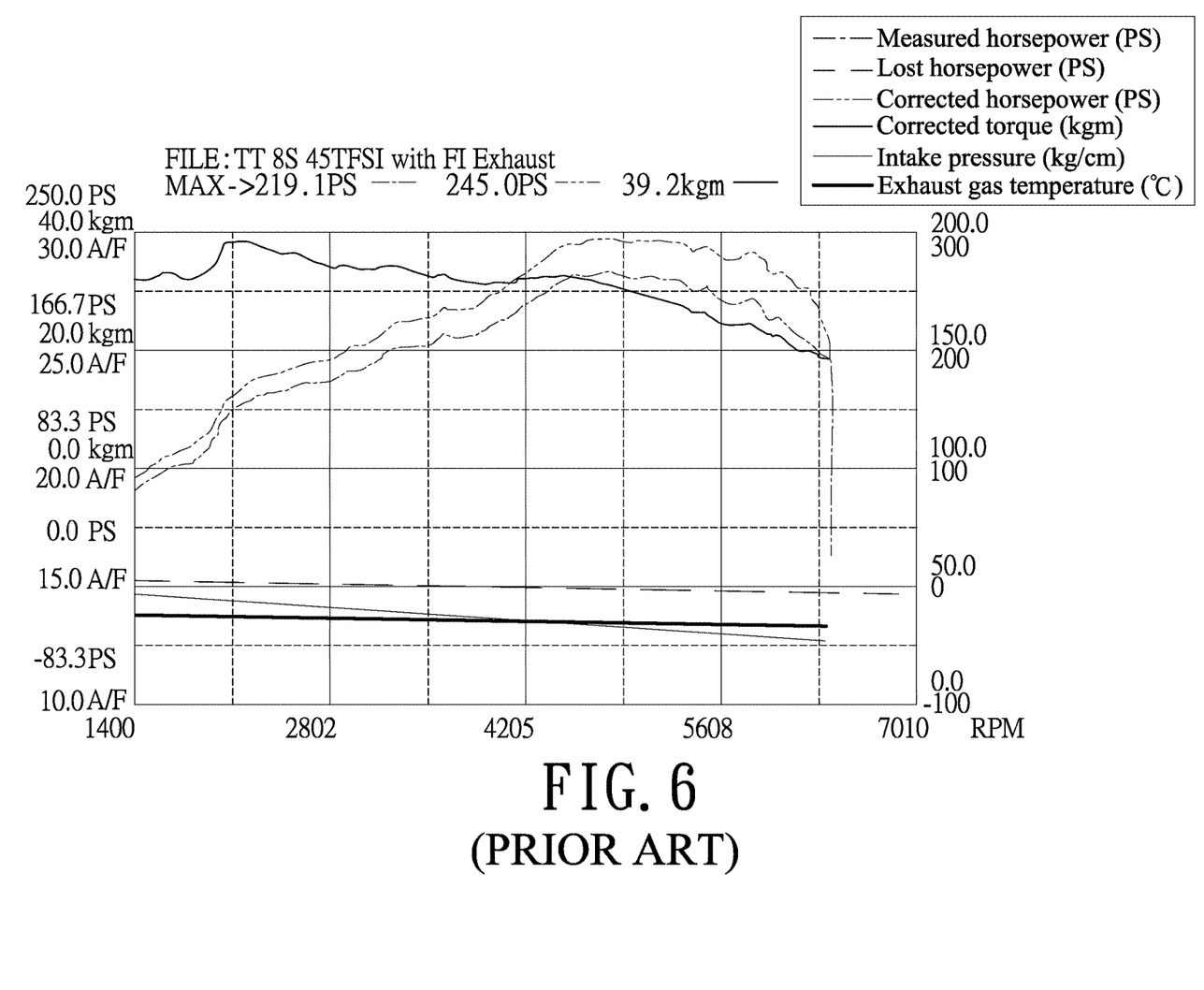
FIG. 6 is a curve diagram showing measured horsepower of a conventional vehicle.

When a conventional vehicle was tested for horsepower, the original tested vehicle is 2016 AUDI TT 45 TFSI Quattro, which was tested with a horsepower machine of Sakura Dyno System horsepower machine. The results show that the horsepower on the wheels is 219 whp and the torque is 39.2 kgm. The air-fuel ratio machine is used to measure the intake and fuel ratio. The results show that average air-fuel ratio of the tested vehicle is 10. Furthermore, a curve diagram showing measured horsepower of a conventional vehicle is revealed in FIG. 6.

Figure 7:
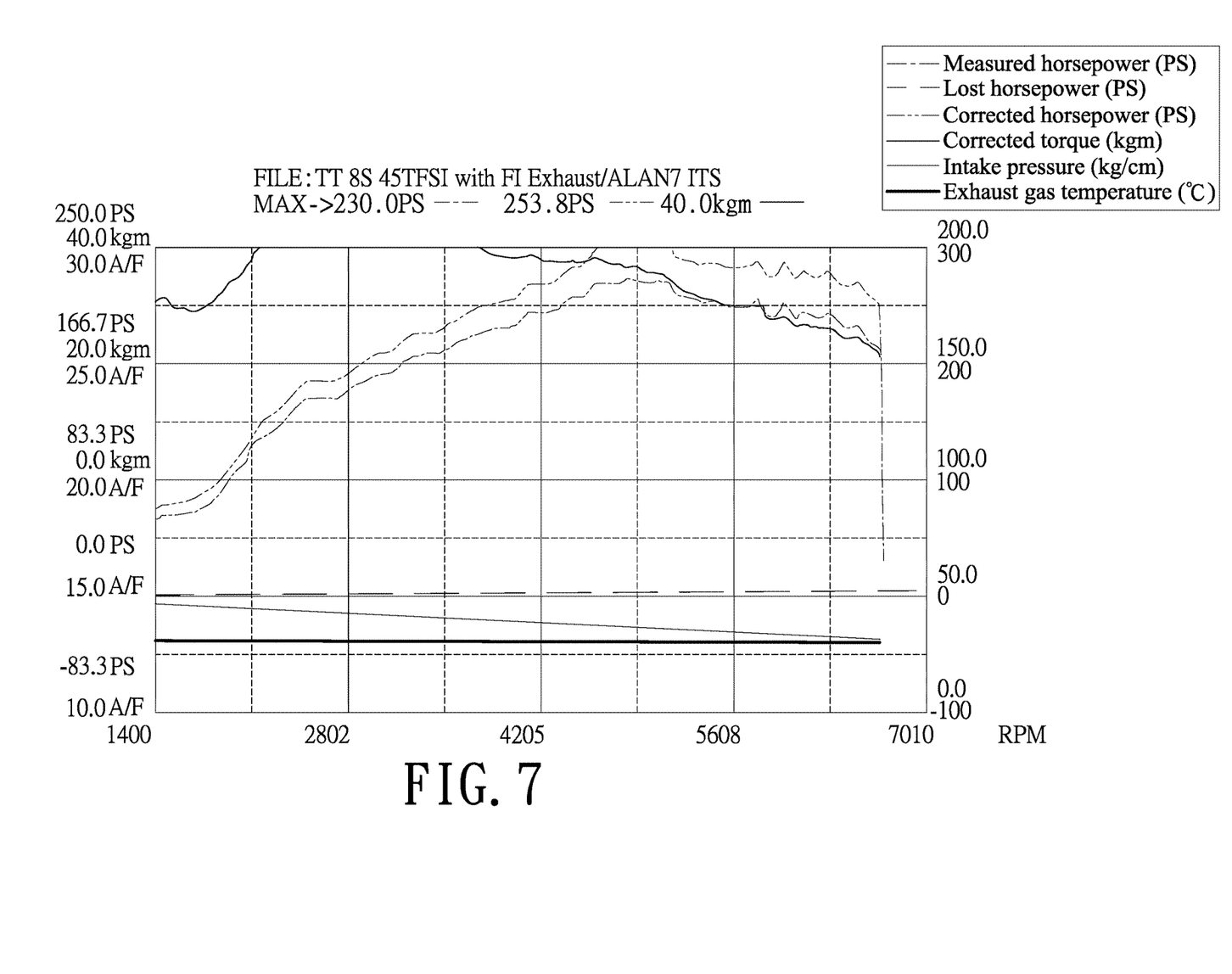
FIG. 7 is a curve diagram showing measured horsepower of an intake swirl gasket according to the present invention.

Referring to FIG. 7, after the intake swirl gasket (3) of the present invention is installed on the tested vehicle, the horsepower on the wheels is 230 whp and the torque is 40.0 kgm. The results show that average air-fuel ratio of the tested vehicle installed with the intake swirl gasket (3) is 12.8. The use of the intake swirl gasket (3) can achieve larger horsepower and torque. Furthermore, due to the improvement of combustion efficiency, the electronic control unit (ECU) automatically learns and adjusts the fuel supply down to the measured air-fuel ratio data, so that the fuel ratio changes significantly.

Additionally, in a 0-400 m linear acceleration test, the tested vehicle is 2016 AUDI TT 45 TFSI Quattro, and the P-Gear satellite positioning instrument is used for testing. The test results of the original tested vehicle are shown in Table 1.

TABLE 1

| Distance | | Speed | Time |
|---|---|---|---|
| 0-20 | m | 4.41 m/s$^2$ | 48.8 km/h | 2.94 S |
| 0-30 | m | 4.31 m/s$^2$ | 60.5 km/h | 3.71 S |
| 0-100 | m | 3.14 m/s$^2$ | 95.2 km/h | 6.84 S |
| 0-200 | m | 1.96 m/s$^2$ | 123.4 km/h | 10.10 S |
| 0-300 | m | 1.96 m/s$^2$ | 142.4 km/h | 12.87 S |
| 0-400 | m | 0.98 m/s$^2$ | 156.1 km/h | 15.20 S |
| 0-100 | km/h | | | 6.92 S @114.59 m |

The time and speed measured when the original tested vehicle passed the end point were 15.20 seconds and 156.1 km/h.

After the intake swirl gasket (3) of the present invention is installed on the tested vehicle, the test results of the tested vehicle are shown in Table 2.

TABLE 2

| Distance | | Speed | Time |
|---|---|---|---|
| 0-20 | m | 6.28 m/s$^2$ | 52.6 km/h | 2.23 S |
| 0-30 | m | 4.81 m/s$^2$ | 65.1 km/h | 2.95 S |
| 0-100 | m | 3.63 m/s$^2$ | 102.5 km/h | 5.84 S |
| 0-200 | m | 1.96 m/s$^2$ | 129.6 km/h | 8.90 S |
| 0-300 | m | 1.96 m/s$^2$ | 157.6 km/h | 11.55 S |
| 0-400 | m | 0.98 m/s$^2$ | 160.5 km/h | 13.80 S |
| 0-100 | km/h | | | 5.30 S @93.28 m |

The tested vehicle has a better accelerated speed after installing the intake swirl gasket (3). The time and speed measured when the tested vehicle passed the end point were 13.80 seconds and 160.5 km/h.

In the vehicle fuel consumption test, the tested vehicle was 2016 AUDI TT 45 TFSI Quattro, and the test was conducted on the same route in the urban area for 1.5 hours. The results showed that the fuel consumption of the original tested vehicle was 7.5 kilometers per liter.

After the intake swirl gasket (3) of the present invention is installed on the tested vehicle, the fuel consumption is 9.2 kilometers per liter. The results showed that the intake swirl gasket (3) makes the tested vehicle more fuel efficient in use.

Compared with the conventional technique available now, the present invention has the following advantages:
1. The present invention has the plural airflow holes and the plural diversion devices, so the airflow can be evenly distributed and guided into the plural intake passages of the cylinder head and effectively mixed with atomized oil to be rapidly filled in the cylinder of the engine so as to achieve better efficiencies of oil gas filling and mixing.
2. The present invention not only improves engine combustion efficiency and enhances horsepower, but also reduces engine knock, exhaust emissions, and fuel consumption.

What is claimed is:

1. An intake swirl gasket, installed between a cylinder head and an intake manifold, comprising:
   plural airflow holes for respectively communicating with plural intake passages of the cylinder head; and
   plural diversion devices respectively disposed in the plural airflow holes and each having an axis and plural splitter blades extended from the axis for connecting to an inner wall of each of the plural airflow holes, wherein each of the plural splitter blades is shaped as an arc to form a recessed surface, across the entire surface, towards the intake manifold at one side thereof and a convex surface, across the entire surface, towards the cylinder head at the other side thereof, and wherein an included angle between each of the plural splitter blades and an end face of the intake swirl gasket oriented towards the cylinder head ranges from 50 to 80 degrees.

2. The intake swirl gasket as claimed in claim 1, wherein the inner wall of each of the plural airflow holes defines a tapered opening to increase flow velocity of airflows through the plural splitter blades.

3. The intake swirl gasket as claimed in claim 1, further being formed integrally with the intake manifold.

4. The intake swirl gasket as claimed in claim 1, wherein the axis of each of the diversion devices is shaped as a cone.

* * * * *